United States Patent
Singh et al.

(10) Patent No.: US 12,435,243 B2
(45) Date of Patent: Oct. 7, 2025

(54) POLISHING OF TRANSITION METALS

(71) Applicant: ENTEGRIS, INC., Billerica, MA (US)

(72) Inventors: Rajiv K. Singh, Newberry, FL (US);
Sunny De, Gainesville, FL (US);
Akshay Rajopadhye, Gainesville, FL (US);
Aditya D. Verma, Gainesville, FL (US)

(73) Assignee: ENTEGRIS, INC., Billerica, MA (US)

( * ) Notice: Subject to any disclaimer, the term of this patent is extended or adjusted under 35 U.S.C. 154(b) by 541 days.

(21) Appl. No.: 17/846,929

(22) Filed: Jun. 22, 2022

(65) Prior Publication Data

US 2023/0002641 A1    Jan. 5, 2023

Related U.S. Application Data

(60) Provisional application No. 63/216,956, filed on Jun. 30, 2021.

(51) Int. Cl.
*C09G 1/02* (2006.01)
*H01L 21/321* (2006.01)

(52) U.S. Cl.
CPC ............ *C09G 1/02* (2013.01); *H01L 21/3212* (2013.01)

(58) Field of Classification Search
None
See application file for complete search history.

(56) References Cited

U.S. PATENT DOCUMENTS

| 7,803,711 B2 | 9/2010 | White |
| 2003/0104198 A1 | 6/2003 | Schumacher |
| 2008/0031832 A1 * | 2/2008 | Wakefield ............... C01G 9/00 424/59 |
| 2009/0035942 A1 | 2/2009 | White |
| 2012/0329279 A1 | 12/2012 | Shi |

(Continued)

FOREIGN PATENT DOCUMENTS

| JP | 2007258735 A | 10/2007 |
| JP | 2015063451 A | 4/2015 |

(Continued)

OTHER PUBLICATIONS

He et al., The Electrochemical Society, Chemical Mechanical Polishing of Molybdenum in Potassium Iodate-Based Acidic Slurries, vol. 7, No. 6, 2018 (abstract only).

(Continued)

*Primary Examiner* — Roberts P Culbert (57) ABSTRACT

The invention provides compositions useful in the polishing of transition metal-containing surfaces typically found on microelectronic devices. In one aspect, the invention provides a composition comprising: a liquid carrier; titania abrasive particles, wherein the particles are at least partially coated with alumina or amorphous silica to provide coated titania abrasive particles; wherein the coated titania abrasive particles have an average diameter of about 50 nm to about 250 nm; and a corrosion inhibitor. The invention, the compositions are advantageously utilized to polish microelectronic device substrates having transition metal-containing surfaces thereon. In certain embodiments, the surfaces are chosen from molybdenum and ruthenium-containing films and show markedly improved selectivity relative to thermal oxide.

7 Claims, 3 Drawing Sheets

(56) References Cited

U.S. PATENT DOCUMENTS

| | | |
|---|---|---|
| 2015/0221520 A1 | 8/2015 | Singh |
| 2016/0251603 A1* | 9/2016 | Steele .................. C11D 3/3715 428/336 |
| 2018/0072916 A1 | 3/2018 | Pandey |
| 2019/0085209 A1 | 3/2019 | Dockery |
| 2020/0071642 A1 | 3/2020 | Thomas |
| 2020/0102479 A1 | 4/2020 | Singh |
| 2020/0181454 A1 | 6/2020 | Ko |
| 2020/0190673 A1 | 6/2020 | Lippy et al. |
| 2021/0108140 A1 | 4/2021 | Youngmin |

FOREIGN PATENT DOCUMENTS

| | | |
|---|---|---|
| JP | 2015525483 A | 9/2015 |
| JP | 2021019111 A | 2/2021 |
| JP | 2021027223 A | 2/2021 |
| KR | 20140125049 A | 10/2014 |
| KR | 20200123648 A | 10/2020 |
| TW | 533299 B | 5/2003 |
| WO | 2005072680 A2 | 8/2005 |
| WO | 2015001293 A1 | 1/2015 |
| WO | 2019151145 A1 | 8/2019 |
| WO | 2021117428 A1 | 6/2021 |

OTHER PUBLICATIONS

Peethala, Chemical Mechanical Polishing of Ruthenium, Cobalt, and Black Diamond Films, Dissertation Abstracts International, 2012, vol. 73-05, Section B (abstract only).

Qu et al., Chemical Mechanical Polishing of Mo Using H2O2 as Oxidizer in Colloidal Silica Based Slurries, the Electrochemical Society, vol. 6, No. 7, 2017 (abstract only).

* cited by examiner

POLISHING OF TRANSITION METALS

TECHNICAL FIELD

This invention relates generally to the field of microelectronic device manufacturing. More particularly, the invention relates to compositions and methods for chemical mechanical polishing of transition metals such as molybdenum, tungsten, cobalt, copper, and ruthenium surfaces.

BACKGROUND

Microelectronic device wafers are used to form integrated circuits. The microelectronic device wafer includes a substrate, such as silicon, into which regions are patterned for deposition of different materials having insulative, conductive or semi-conductive properties. In order to obtain the correct patterning, excess material used in forming the layers on the substrate must be removed. Further, to fabricate functional and reliable circuitry, it is often important to prepare a flat or planar microelectronic wafer surface prior to subsequent processing. Thus, it is necessary to planarize and/or polish certain surfaces of a microelectronic device wafer. Additionally, for optical devices, it may be necessary to smooth the surfaces for optical transmission or to remove sub-surface damage.

Chemical Mechanical Polishing or Planarization ("CMP") is a process in which material is removed from a surface of a microelectronic device wafer, and the surface is planarized and polished by coupling a physical process such as abrasion with a chemical process such as oxidation or chelation. In its most rudimentary form, CMP involves applying slurry, e.g., a solution of an abrasive and an active chemistry, to a polishing pad that buffs the surface of a microelectronic device wafer to achieve the removal, planarization, and polishing processes. It is not typically desirable for the removal or polishing process to be comprised of purely physical or purely chemical action, but rather the synergistic combination of both in order to achieve fast, uniform removal. In the fabrication of integrated circuits, the CMP slurry should also be able to preferentially remove films that comprise complex layers of metals and other materials so that highly planar surfaces can be produced for subsequent photolithography, patterning, etching, and thin-film processing. In conventional CMP operations, a substrate carrier or polishing head is mounted on a carrier assembly and positioned in contact with a polishing pad in a CMP apparatus. The carrier assembly provides a controllable pressure to the substrate pressing the substrate against the polishing pad. The pad is then moved relative to the substrate.

Molybdenum metal is used in microelectronic devices for interconnects, photo masks, etc. Generally, the molybdenum is present on the device in an excess amount, which then requires the excess to be removed by polishing or lapping. Molybdenum polishing generally presents low removal rates when using silica abrasive compositions. When oxidizers such as hydrogen peroxide are used, high corrosion rates are often encountered.

Ruthenium is under consideration for replacement of Ta/TaN as barrier materials for copper interconnects, as lower electrode material in metal-insulator-metal capacitors, and as next generation liners and conducting metals. Ruthenium can be polished using abrasives in conjunction with oxidizing agents; unfortunately, certain of these compositions pose safety and toxicity concerns due to reaction products of such a polishing process. Additionally, ruthenium polishing is often accompanied by low removal rates and high etching rates using conventional (colloidal) silica and iodate (i.e., oxidizer) chemistry. Additionally, such methodology presents severe pad staining, especially at neutral to alkaline pH conditions, along with poor reproducibility. In this regard, pad staining is believed to be due to by-products formed as a result of oxidation of ruthenium, potentially generating insoluble species which ultimately may cause undesirable scratching of the ruthenium surface.

Thus, a need exists for new and improved compositions and methods for the polishing of molybdenum and ruthenium which are not encumbered with these difficulties.

SUMMARY

In summary, the invention provides compositions useful in the polishing of transition metal-containing surfaces typically found on microelectronic devices. In one aspect, the invention provides a composition comprising:
  a liquid carrier;
  titania abrasive particles, wherein the particles are at least partially coated with alumina or amorphous silica to provide coated titania abrasive particles;
  wherein the coated titania abrasive particles have an average diameter of about 50 nm to about 250 nm; and
  a corrosion inhibitor.

In the method of the invention, the compositions are advantageously utilized to polish microelectronic device substrates having transition metal-containing surfaces thereon. In certain embodiments, the surfaces are chosen from molybdenum and ruthenium-containing films.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

The compositions of the invention are useful as CMP polishing compositions (i.e., slurries) for transition metal-containing materials. In one embodiment, these metals include ruthenium, rhodium, palladium, osmium, iridium, platinum, gold, silver, copper, and rhenium. In another embodiment, the metals include tungsten, cobalt, and copper, along with the oxides and nitrides of such metals. In another embodiment, the metals include ruthenium and molybdenum. Accordingly, the invention provides in a first aspect, a composition comprising:

a liquid carrier;
titania abrasive particles, wherein the particles are at least partially coated with alumina or amorphous silica to provide coated titania abrasive particles;
wherein the coated titania abrasive particles have an average diameter of about 50 nm to about 250 nm; and
a corrosion inhibitor.

In the invention, the coated titania (TiO2) particles are widely commercially-available. Such coated titania generally have an average diameter of about 50 to about 250 nm, about 100 to about 250 nm, about 50 nm to about 150 nm, or about 20 nm to about 50 nm. The coating of these titania particles with amorphous silica or alumina can be accomplished by known methodology. See for example, "Dense silica coating of titania nanoparticles by seeded polymerization technique", Ahmed Mohamed El-Toni, Shu Yin, and Tsugio Sato, *Colloids and Surfaces A*: Physicochemical and Engineering Aspects, Volume 274, Issues 1-3, 15 Feb. 2006, pages 229-233. The coating of titania with alumina ($Al_2O_3$) can be accomplished by deposition in a gas phase by: hydrolysis or decomposition of volatile substances; addition of oxides, hydroxides or substances that can be absorbed onto the surface during pigment grinding, which results in partial coating of the pigment surface; or precipitation of the coating from aqueous solution onto the suspended TiO2 particles.

In one embodiment, the titania abrasive particles are in the rutile form. In general, component b. above, i.e., the coated titania particles, are comprised primarily of titanium dioxide (along with the alumina or amorphous silica coating); however, minor amounts of dopants or materials which are other than titanium dioxide may be present within the titania abrasive particles, such as about 5% by weight, or less, about 2% by weight, or less, or about 1% or less.

As noted above, the compositions of the invention comprise at least one organic corrosion inhibitor. Essentially, these organic corrosion inhibitors fall into the general class of surfactants. As used herein, the term "surfactant" refers to an organic compound that lowers the surface tension (or interfacial tension) between two liquids or between a liquid and a solid, typically an organic amphiphilic compound that contains a hydrophobic group (e.g., a hydrocarbon (e.g., alkyl) "tail") and a hydrophilic group. In one embodiment, these surfactants or metal corrosion inhibitors are cationic surfactants. Cationic surfactants are essentially surface-active molecules which possess at least one positively-charged moiety. In one embodiment, the cationic surfactant is chosen from $C_6$-$C_{18}$ ammonium halides. The "$C_6$-$C_{18}$" modifier refers the number of carbon atoms in the surfactant and may include aliphatic and aromatic moieties. In another embodiment, the cationic surfactant is chosen from $C_{12}$-$C_{18}$ ammonium halides.

Exemplary cationic surfactants (corrosion inhibitors) include, but are not limited to, cetyl trimethylammonium bromide (CTAB) (also known as hexadecyltrimethyl ammonium bromide), hexadecyltrimethyl ammonium chloride (CTAC), heptadecanefluorooctane sulfonic acid, tetraethylammonium halides, stearyl trimethylammonium chloride, 4-(4-diethylaminophenylazo)-1-(4-nitrobenzyl)pyridium bromide, cetylpyridinium chloride monohydrate, benzalkonium chloride, benzalkonium bromide, benzethonium chloride benzyldimethyldodecylammonium chloride, benzyldimethylhexadecylammonium chloride, hexadecyltrimethylammonium bromide, dimethyldioctadecylammonium chloride, dodecyltrimethylammonium chloride, didodecyldimethylammonium bromide, di(hydrogenated tallow)dimethylammonium chloride, tetraheptylammonium bromide, tetrakis(decyl)ammonium bromide, and oxyphenonium bromide, dimethyldioctadecylammonium chloride, dimethyldihexadecylammonium bromide, and di(hydrogenated tallow)dimethylammonium chloride. In one embodiment, the corrosion inhibitor/surfactant is chosen from benzalkonium chloride and benzalkonium bromide.

These corrosion inhibitors/surfactants are typically present in amounts of about 0.0001 to about 5 percent, by weight, based on the total weight of the composition, and as found to be necessary by empirical observation.

In the compositions of the invention, the relative amount of coated titania particles can be adjusted as desired, based on the total weight of the composition, for the polishing of a particular transition metal surface. In some embodiments, the coated titania particles are present in an amount of about 0.001 to about 5 weight percent, or about 0.1 to about 1 weight percent, based on the total weight of the composition. Any suitable amount of the abrasive can be present in the polishing composition, depending on both the surface being polished as well as other conditions utilized. In some embodiments, the abrasive is present in the polishing composition at a concentration of about 0.0005 wt. % or more, e.g., about 0.001 wt. % or more, about 0.0025 wt. % or more, about 0.005 wt. % or more, about 0.01 wt. % or more, about 0.025 wt. % or more, or about 0.05 wt. % or more. More typically, the abrasive is present in the polishing composition at a concentration of about 0.001 wt. % or more, e.g., about 0.0025 wt. % or more, about 0.005 wt. % or more, about 0.01 wt. % or more, about 0.025 wt. % or more, or about 0.05 wt. % or more. Alternatively, or in addition, the abrasive is present in the polishing composition at a concentration of about 30 wt. % or less, e.g., about 20 wt. % or less, about 10 wt. % or less, about 5 wt. % or less, about 1 wt. % or less, about 0.5 wt. % or less, about 0.1 wt. % or less, or about 0.05 wt. % or less. More typically, the abrasive is present in the polishing composition at a concentration of about 1 wt. % or less, e.g., about 0.5 wt. % or less, about 0.1 wt. % or less, or about 0.05 wt. % or less. Thus, the abrasive can be present in the polishing composition within a range bounded by any two of the aforementioned endpoints. For example, the abrasive can be present in the polishing composition at a concentration of about 0.0005 wt. % to about 10 wt. %, e.g., about 0.001 wt. % to about 10 wt. %, about 0.001 wt. % to about 1 wt. %, about 0.001 wt. % to about 0.5 wt. %, about 0.001 wt. % to about 0.1 wt. %, about 0.001 wt. % to about 0.05 wt. %, about 0.005 wt. % to about 10 wt. %, about 0.005 wt. % to about 1 wt. %, about 0.005 wt. % to about 0.5 wt. %, about 0.005 wt. % to about 0.1 wt. %, about 0.005 wt. % to about 0.05 wt. %, about 0.01 wt. % to about 10 wt. %, about 0.01 wt. % to about 1 wt. %, about 0.01 wt. % to about 0.5 wt. %, about 0.01 wt. % to about 0.1 wt. %, about 0.01 wt. % to about 0.05 wt. %, about 0.05 wt. % to about 10 wt. %, about 0.05 wt. % to about 1 wt. %, about 0.05 wt. % to about 0.5 wt. %, about 0.05 wt. % to about 0.1 wt. %, or about 0.05 wt. % to about 0.05 wt. %. In certain embodiments, the abrasive is present in the polishing composition at a concentration of about 0.001 wt. % to about 1 wt. %.

In another embodiment, the compositions of the invention further comprise at least one oxidizing agent. As used herein, the term "oxidizing agent" refers to any chemical, other than ambient air, capable of oxidizing ruthenium above the +4 oxidation state. An exemplary list of such oxidizing agents includes, but is not limited to, peroxides (e.g., $H_2O_2$), periodic acid, oxone, bromates, bromites, hypobromites, chlorates, chlorites, hypochlorites, perchlorates, iodates, hypoiodates, periodates, cerium (IV) salts, permanganates, silver (III) salts, peroxyacetic acid, organohalo-oxy compounds, monoperoxy sulfates, monoperoxy sulfites, monoperoxy thiosulfates, monoperoxyphosphates, monoperoxypyrophosphates, and monoperoxyhypophosphate. Additional oxidizing agents include hydrogen peroxide; other per-compounds such as salts and acids containing peroxomonosulfate, perborate, perchlorate, periodate, persulfate, permanganate, and peracetate anions; and amine-N-oxides. Further examples include $FeCl_3$, $FeF_3$, $Fe(NO_3)_3$, $Sr(NO_3)_2$, $COF_3$, $MnF_3$, ozone, $2KHSO_5 \cdot KHSO_4 \cdot K_7SO_4$, iodic acid, vanadium (V) oxide, vanadium (IV, V) oxide, ammonium vanadate, ammonium polyatomic salts (e.g., ammonium peroxomonosulfate, ammonium chlorite ($NH_4ClO_2$), ammonium chlorate ($NH_4ClO_3$), ammonium iodate ($NH_4IO_3$), ammonium nitrate ($NH_4NO_3$), ammonium perborate ($NH_4BO_3$), ammonium perchlorate ($NH_4ClO_4$), ammonium periodate ($NH_4IO_4$), ammonium persulfate (($NH_4)_2S_2O_8$), ammonium hypochlorite ($NH_4ClO$)), ammonium tungstate (($NH_4)_{10}H_2(W_2O_7)$), sodium polyatotnic salts (e.g., sodium persulfate ($Na_2S_2O_8$), sodium hypochlorite (NaClO), sodium perborate), potassium polyatomic salts (e.g., potassium iodate ($KIO_3$), potassium permanganate ($KMnO_4$), potassium persulfate, nitric acid ($HNO_3$), potassium persulfate ($K_2S_2O_8$), potassium hypochlorite (KClO)), tetramethyl ammonium polyatomic salts (e.g., tetramethylammonium chlorite (($N(CH_3)_4)ClO_2$), tetramethylammonium chlorate (($N(CH_3)_4)ClO_3$), tetramethylammonium iodate (($N(CH_3)_4)IO_3$), tetramethylammonium perborate (($N(CH_3)_4)BO_3$), tetramethylammonium perchlorate ((N$(CH_3)_4)ClO_4$), tetramethylammonium periodate (($N(CH_3)_4$) $IO_4$), tetramethylammonium persulfate (($N(CH_3)_4)S_2O_8$)), tetrabutylammonium polyatomic salts (e.g., tetrabutylammonium peroxomonosulfate), peroxotnonosulfuric acid, ferric nitrate ($Fe(NO_3)_3$), urea hydrogen peroxide ((CO$(NH_2)_2)H_2O_2$), peracetic acid ($CH_3(CO)OOH$), 1,4-benzoquinone, toluquinone, dimethyl-1,4-benzoquinone, chloranil, alloxan, N-methylmorpholine N-oxide, trimethylamine N-oxide, and combinations thereof. Other examples of oxidizing agents include perbromic acid, telluric acid trifluoroperacetic acid, m-chloroperbenzoic acid, t-butyl hydroperoxide, dibenzoyl peroxide, potassium peroxysulfate (e.g., Oxone® DuPont), methylethylketone peroxide, acetone peroxide, ethylhydroperoxide, and cumene hydroperoxide.

In one embodiment, the amount of oxidizing agent is in a range from about 0.001 wt % to 5 wt %, and in another embodiment in a range of about 0.001 wt % to about 2 wt %, based on the total weight of the composition.

In certain embodiments, a peroxide oxidizing agent is used in concert with an Fe(II) or Fe(III) source, such as $Fe(NO_3)_3$ in a Fenton reaction, which generates a hydroxyl radical in situ, as an oxidant.

The compositions of the invention may also further comprise pH stabilizers. Both organic and inorganic pH stabilizers can be used. Examples of inorganic pH stabilizers include phosphate, phthalates, bicarbonates, silicates. Examples of organic pH stabilizers include amines, glycine, N-cyclohexyl-2-aminoethanesulfonic acid. In certain embodiments, the compositions of the invention will have a pH of about 2 to about 5. If necessary for a given composition, pH adjustors such as acetic acid, nitric acid, sulfuric acid, hydrochloric acid, and phosphoric acid may be utilized, or in the case of making a given composition more alkaline, pH adjustors such as KOH, tetramethylammonium hydroxide (TMAH), tetrabutylammonium hydroxide (TBAH), etc., may be utilized.

The composition can also further comprise biocides such as fungicides. Examples of fungicides include tetramethylammonium chloride, tetraethylammonium chloride, tetrapropylammonium chloride, alkylbenzyldimethylammonium chloride, and alkylbenzyldimethylammoniumhydroxide, 3,5-di-methyl tetrahydro 1,3,5,2H-thiadiazine-2 thione, 2-methyl-4-isothiazolin-3-one and 5-chloro-2-methyl-4-isothiazolin-3-one, sodium chlorite and sodium hypochlorite.

As noted above, the composition comprises a liquid carrier. The liquid carrier is comprised of water (e.g., deionized water) and optionally further comprises one or more water-miscible organic solvents. Examples of organic solvents that can be used include alcohols such as isopropyl alcohol, ethanol, 1-propanol, methanol, 1-hexanol, and the like; aldehydes such as acetaldehyde and the like; ketones such as acetone, diacetone alcohol, methyl ethyl ketone, and the like; esters such as ethyl formate, propyl formate, ethyl acetate, methyl acetate, methyl lactate, butyl lactate, ethyl lactate, and the like; ethers including sulfoxides such as dimethyl sulfoxide (DMSO), tetrahydrofuran, dioxane, diglyme, and the like; amides such as N, N-dimethylformamide, dimethylimidazolidinone, N-methylpyrrolidone, and the like; polyhydric alcohols and derivatives of the same such as ethylene glycol, glycerol, diethylene glycol, diethylene glycol monomethyl ether, and the like; and nitrogen-containing organic compounds such as acetonitrile, amylamine, isopropylamine, imidazole, dimethylamine, and the like. In one embodiment, the liquid carrier is water alone, i.e., without the presence of an organic solvent.

In certain embodiments, the compositions of the invention consist or consist essentially of components a. and b., above, with optional ingredients as set forth herein. In certain embodiments, the composition is substantially free of an oxidizing agent. As used herein, the phrase "substantially free of an oxidizing agent" refers to a composition comprising less than about 1 ppm of an oxidizing agent, e.g., less than about 100 ppb, less than about 10 ppb, less than about 1 ppb, less than about 100 ppt, less than about 10 ppt, or less than about 1 ppt. In certain embodiments, the polishing composition is free of an oxidizing agent (i.e., below the level of detection).

The polishing process can be performed at a temperature of from about 15° C. to about 100° C. Higher temperatures are expected to increase the polishing rate of molybdenum or ruthenium. In one embodiment, the temperature range is about 25° C. to about 65° C. One way to reach a higher temperature is to preheat the slurry before being supplied to the CMP apparatus.

Regarding the polishing pad, any type of polymer-based polishing pad can generally be used. Examples of polishing pads are based on polyurethane pads and suede pads. The pad thickness can vary from 0.1 mm to 25 mm. The hardness of the suede pads can vary from Asker C hardness of 5 to Asker Hardness of 95. The compressibility of the suede pad can be from 0.1% to 40%. The pore size of the suede poromeric pads can vary from 2 microns to 100 microns with the size in the range of 20 to 60 microns in one embodiment. The poromeric pad layer can have a backing pad layer of poly(ethylene terephthalate) (PET), or foam or non-woven material with thickness between 30 microns to 25 mms.

Besides poromeric pads, polyurethane pads can also be used. Examples of polyurethane-based pads include D-100 pads from Cabot Microelectronics, IC and Suba Series from Dow Electronics Materials. The hardness of such pads range from Shore D value of 5 to 99. The porosity of such pads can vary from 0.1% to 40%. It is noted that generally any other type of polymeric material can be used with the slurry. Besides the use of poromeric pads, metal pads (such as cast iron, copper, tin), granite, or resin surfaces can be also used as pads.

Suitable apparatuses for chemical mechanical polishing are commercially available. The method of the invention generally involves mixing the slurry composition, comprising the components set forth above, placing the dielectric substrate to be polished into a CMP apparatus having a rotating pad, and then performing chemical mechanical polishing using the slurry compositions of the invention. In this method of polishing, at least some of the dielectric substrate surface will be removed or abraded, thereby providing a suitably polished dielectric substrate.

Accordingly, in another aspect, the invention provides a method for chemical mechanical polishing a substrate which includes a surface comprising at least one transition metal, the method comprising:
  contacting the substrate with a composition comprising:
    a liquid carrier;
    titania abrasive particles, wherein the particles are at least partially coated with alumina or amorphous silica to provide coated titania abrasive particles;
    wherein the coated titania abrasive particles have an average diameter of about 50 nm to about 250 nm; and
    a corrosion inhibitor.
  moving the composition relative to the substrate; and
  abrading the substrate to remove a portion of the surface comprising the at least one transition metal.

Advantageously, the compositions and methods of the invention show markedly improved removal rates when compared to conventional slurries, in some embodiments as much as or greater than about 200%. Additionally, the compositions and methods of the invention, in certain embodiments, exhibit selectivity of molybdenum over thermal oxide of about 100:1 for the polishing of molybdenum-containing films, and at about 12:1 for ruthenium-containing films.

The compositions of the invention are easily formulated by simple addition of the respective ingredients and mixing to homogeneous condition. The compositions may be readily formulated as single-package formulations or multi-part formulations that are mixed at or before the point of use. The concentrations of the respective ingredients may be widely varied in specific multiples of the composition, i.e., more dilute or more concentrated, and it will be appreciated that the compositions as described herein can variously and alternatively comprise, consist, or consist essentially of any combination of components consistent with this disclosure.

Accordingly, in another aspect, the invention provides a kit, including in one or more containers, the components chosen from a., b., and c., along with any optional components, as set forth above, for combination at the point of use.

EXAMPLES

Abbreviations

DL=detection limit
CMP=chemical mechanical planarization or polishing
DIW=deionized water
SER=Static Etch Rate
CI=corrosion inhibitor (listed as an amount)

Part A—Molybdenum Polishing

In this Part A, all concentrations are expressed in weight percentages unless otherwise indicated. Water is added to make the composition 100 weight percent. Additionally, CMP experiments were run using the procedures and experimental conditions given below. The data presented in the examples below was generated by polishing 1.75"×1.75" coupons cut out of blanket Molybdenum wafers. The thickness of the molybdenum films as measured using a profilometer was 5000 Å. This thickness was confirmed using a 4-point resistivity probe after receipt.

Various abrasives were investigated including colloidal silica, which is considered to be a conventional abrasive for the polishing of Molybdenum surfaces. The slurries at the point of use (PoU) were prepared by diluting the slurries of higher solids loading. The appropriate weight of original slurry was mixed with deionized water (DIW) to achieve the desired solids loading. For example, 10.6 g of silica slurry with original solids loading of 47 weight percent was stirred in 89.4 g DIW such that final particle content of 5 weight percent was achieved. Operating pH varied as per the study as mentioned in the examples below. Aqueous solutions of nitric acid and potassium hydroxide were used as pH modifiers.

The CMP tool used to conduct the polishing runs was Automet 250 supplied by Buehler with the platen size of 12". The rotational speed was set at 150 RPM for the base and 30 RPM for the head. A peristaltic slurry dosing pump was set to dispense the polishing slurry at 30 ml/min throughout the study. A Cabot D100 pad with concentric grooves was employed for all the runs except where the effect of pad variation was tested on the removal rate. Polishing duration was set for 60 seconds. The pad temperature, wherever mentioned was measured during the polishing using the IR thermometer.

The change in the film thickness due to polishing was determined measuring the film thickness before and after polishing using the 4-point resistivity probe. The non-uniformity in the polishing observed from the varied values of the film thickness for a polished sample was due to non-uniform pressure distribution from the Buehler polisher. To account for this non-uniformity, the removal rates were determined based on the weight of the film lost during the polishing.

Example 1 (Samples A-F)

The Mo coupons were polished using slurries A through F at an operating pH of 1.5 and down-pressure of 4 psi. Two different classes of abrasives were utilized, namely silica and titania. All the abrasives are sourced from different suppliers. These were the 'abrasives alone' slurries; meaning that no oxidizing chemistry was introduced to these formulations. A down pressure of 4 psi was used throughout these runs. The solids loading for each slurry and the corresponding removal rate are set forth in Table 1. As it is apparent from the values in the table, titania-based slurries yielded highest removal rates among all the polishing runs within this group. A higher rate for slurry E containing titania particles of APS of 410 nm can be attributed to its larger particle size. However, the comparable rate observed by polishing in presence of slurry F and G containing titania particle of APS 200 nm was a surprise. This higher removal rate is attributed to the surface modification of the titania particle in these slurries. The novelty of this surface modification comes from the inorganic coating with surface doped transition metal oxide. This surface functionalization imparts catalytic activity to the titania particles which act as heterogeneous catalytic centers when in contact with the Mo surface. This behavior mimics the CMP effect when the Mo surface is polishing using slurries containing these particles. The effect is significant enough to maintain the removal rates even lower solids loadings as low as 1%.

TABLE 1

Removal rate data for abrasives alone slurries at operating pH of 1.5

| Slurry Formulation | Slurry | Abrasive | Particle Size (nm) | Solids Loading (%) | Average Removal Rate (Å/minute) |
|---|---|---|---|---|---|
| Abrasive, DIW, pH Modifier | A | Silica (Nalco2320, Nalco) | 135 | 5 | 110 |
| | B | Silica (PL-3, Fuso) | 75 | 23 | 256 |
| | C | Silica (Nalco13573, Nalco) | 40 | 27 | 192 |
| | D | Silica (PL-3, Fuso) | 35 | 20 | 130 |
| | E | Uncoated Titania (R900, Chemours) | 410 | 5 | 946 |
| | F | Alumina-Coated Titania | 200 | 5 | 943 |
| | G | Alumina-Coated Titania | 200 | 1 | 872 |

Example 2

The Mo coupons were further polished using the 'abrasive alone' slurry containing the unique coated titania particles described in the Example 1, this time as a function of the operating pH. The operating pH was varied between 1.5 and 13, keeping the solids loading of 5% and down pressure of 4 psi. Table 2 shows the Mo removal rates corresponding to each operating pH. The Mo removal rate is evidently strongly dependent on the operating pH with highly acidic slurry yielding the highest removal rate. The effect of pH was more pronounced presence of titania abrasives as opposed to silica abrasive as the removal rates were higher in comparison. The static etch rate (SER) for Mo at this pH was below the detection limit.

TABLE 2

Removal rate data for abrasives alone slurries at different operating pH

| Slurry Formulation | PH | Average Removal Rate (Å/Minute) |
|---|---|---|
| Slurry F (Same as Example 1) | 1.5 | 943 |
| | 2 | 673 |
| | 3 | 362 |
| | 4 | 335 |
| | 9.5 | 398 |
| | 13 | 170 |

Example 3

The Mo coupons were polished in presence of slurry F at a constant operating pH of 1.5, this time on different polishing pads to investigate the performance of the slurry in presence of different pads with varying hardness values. The removal rates associated with various pads along with their respective hardness values are mentioned in Table 2. The hardness values were determined on a shore D scale using a durometer purchased from Electromatic Equipment Co. Inc. The softer pads (ones with lower hardness) exhibited higher removal rates which is intuitive since the softer pad would correspond to higher contact area between the pad and the Mo surface.

TABLE 3

Effect of pad variation on the Mo removal rate

| Slurry Formulation | Pad | Shore D Hardness | Average Removal Rate (Å/minute) |
|---|---|---|---|
| Slurry F* at pH = 1.5 | D100 | 50 | 572 |
| | FPK | 45 | 520 |
| | 13M | 40 | 383 |
| | ZAN100g | 34 | 698 |
| | SUBA800 | 15 | 627 |

Slurry F and Slurry G are the same particles at the same composition pH, with different solids loadings, i.e., 5 weight percent and 1 weight percent, respectively.

Example 4

Figure 1:
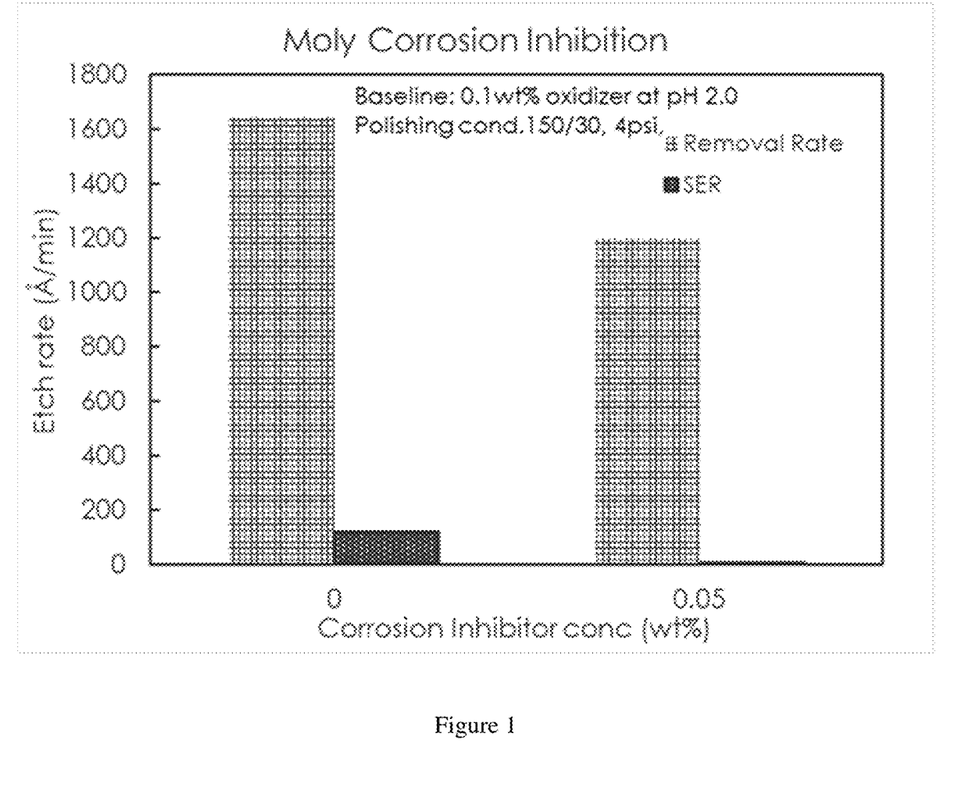
FIG. 1 is a graph of Etch rate in angstroms per minute of a molybdenum substrate, represented by the hatched columns, versus concentration of corrosion inhibitor. The designation "SER" refers to Static Etch Rate (dotted columns). This data corresponds to Example 4.

Slurry G was further modified by adding an oxidizer to investigate the incensement in the removal rate due to the oxidative chemistry between Mo and the oxidizer. Hydrogen Peroxide was added as on oxidizer at a concentration of 0.1%. 100% increment was observed after the addition of the oxidizer. However, the SER was significantly higher as compared to 'abrasives alone' formulation. Various corrosion inhibitors (CI 1 through 8, Dodecyltrimethyl Ammonium Bromide (1), Glycine (2), Benzotriazole (3), Oleic Imidazoline (4), Secondary alkyl Sulfonate (5), Ammonium Lauryl Sulfate (6) Benzalkonium Chloride (7), Benzethonium Chloride (8)). The room temperature SER data in presence of these inhibitors with 0.1% oxidizer concentration the operating pH is presented in table 4. Two inhibitors, CI-7 and CI-8 exhibited maximum effectiveness where the SER values were below the detection limit.

TABLE 4

SER and RR data in presence of oxidizer and corrosion inhibitor

| Slurry | Oxidizer (%) | Corrosion Inhibitor | CI (%) | SER (Å/minute) |
|---|---|---|---|---|
| G | — | — | — | <DL |
| G | 0.1 | — | — | 140 |
| G1 | 0.1 | 1 | 1 mM | 30 |
| G2 | 0.1 | 2 | 0.1 | 130 |
| G3 | 0.1 | 3 | 0.1 | 145 |
| G4 | 0.1 | 4 | 0.5 | 124 |
| G5 | 0.1 | 5 | 0.5 | 138 |
| G6 | 0.1 | 6 | 0.5 | 100 |
| G7 | 0.1 | 7 | 0.05 | <DL |
| G8 | 0.1 | 8 | 0.05 | <DL |

Example 5

Figure 2:
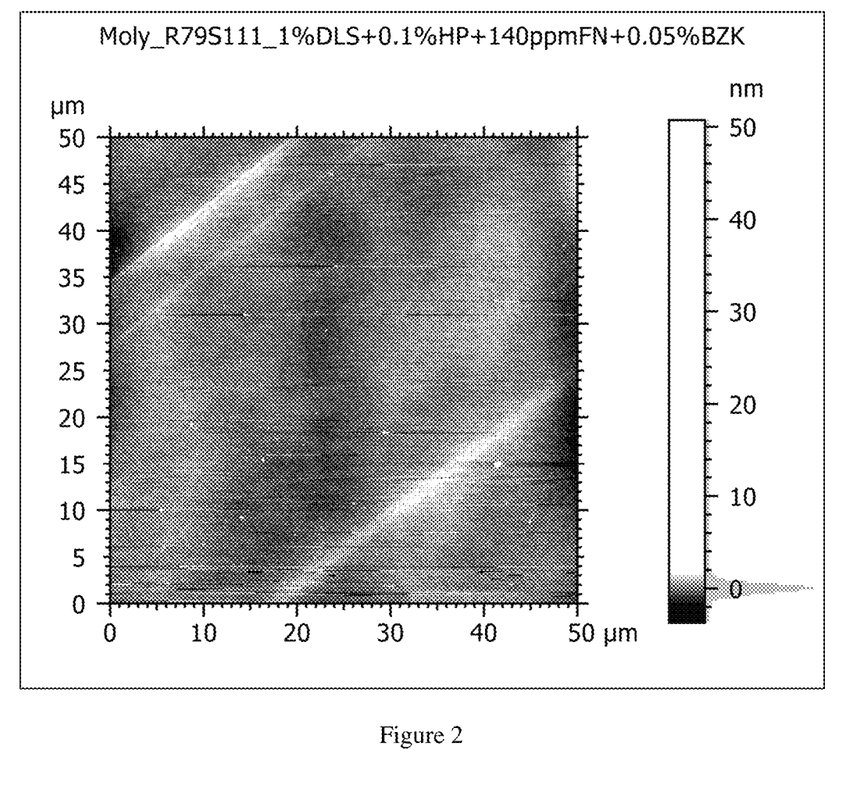
FIG. 2 is a surface finish of a molybdenum surface polished utilizing a composition of the invention. This data corresponds to Example 5.
Figure 3:
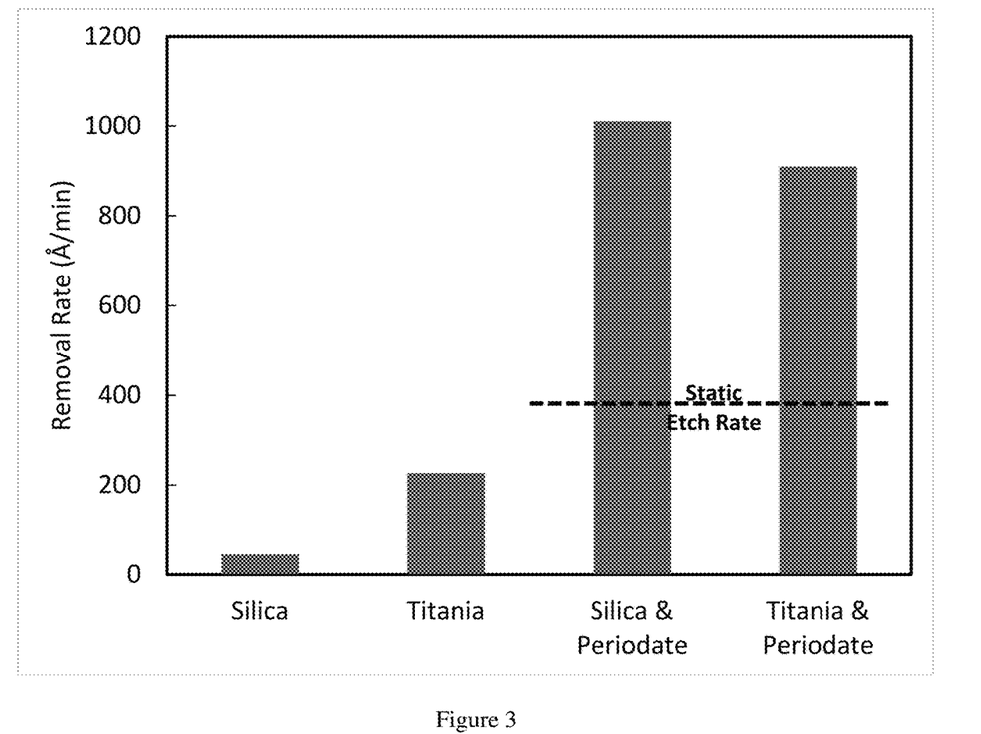
FIG. 3 is a graph of removal rate in angstroms per minute for various abrasive and abrasive/oxidizer combinations.

After observing the significantly reduced SER values in presence of slurry G7 and G8, further modifications were made to the formulation of slurry G to invoke catalytic activity similar to Fenton's reaction by introducing the Fenton's catalyst, such as, Iron (III) Nitrate Nonahydrate to investigate further increment in the removal rate. 140 ppm of the catalyst added to the formulation in example 5 and Mo removal rates and SER were tested. The removal rates were increased by approximately 20% after addition of the catalyst without compromising the corrosion inhibition efficiency. The SER at various concentrations of oxidizer with 140 ppm catalyst are recorded in Table 5.

TABLE 5

Effect of addition of catalyst and corrosion inhibition efficiency

| Slurry | Oxidizer (%) | Catalyst (PPm) | Corrosion Inhibitor | CI (%) | SER (Å/minute) | Average Removal Rate (Å/minute) |
|---|---|---|---|---|---|---|
| G | | | | | <DL | 872 |
| G7 | 0.1 | | 8 | 0.05 | <DL | 1646 |
| G7 | 0.1 | 140 | 8 | 0.05 | 4 | 1833 |
| G7 | 0.2 | 140 | 8 | 0.05 | 5 | |
| G7 | 0.3 | 140 | 8 | 0.05 | 9 | |
| G7 | 0.4 | 140 | 8 | 0.05 | 8 | |
| G7 | 0.5 | 140 | 8 | 0.05 | 15 | |
| G7 | 1 | 140 | 8 | 0.05 | 25 | 2255 |

Part B—Ruthenium Polishing Examples

Experimental Setup

All the removal rate experiments below were performed on Buehler Automet 250 tabletop polisher, with a 1.25"× 1.25" Ruthenium PVD evaporation coupons, with Platen speed of 100 RPM and head speed of 60 RPM. Flow rate of 30 mL/min was maintained. Data was generated on a felt-type SUBA-1200 polishing pad. The removal rate was measured using 5-point characterization with 4-point probe (ResMap)

TABLE 6

Removal rate vs different abrasives at 3 psi DF and pH 11.5 (no other chemistry involved)

| Abrasive Type | Abrasive Size (nm) | Solids Loading | PH | Removal Rate (Å/minute) |
|---|---|---|---|---|
| Alumina coated titania (invention) | ~200 | 2.5% | 11.5 | 204 |
| Aluminum coated titania (invention) | ~200 | 5% | 11.5 | 245 |
| Titania | ~230 | 2.5% | 11.5 | 120 |
| Titania | ~230 | 5% | 11.5 | 140 |
| Aluminum coated titania (invention) | ~400 | 2.5% | 11.5 | 225 |
| Aluminum coated titania (invention) | ~400 | 5% | 11.5 | 273 |
| Silica | 135 | 2.5% | 11.5 | 48 |
| Silica | 135 | 5% | 11.5 | 53 |
| Alumina | 150 | 2.5% | 11.5 | 25 |
| Alumina | 150 | 5% | 11.5 | 32 |

This set of experiments show that aluminum coated titania particles have a catalytic reaction with the Ruthenium surface to form a passivation layer of $RuO_x^-$, which is easily removed by abrasives and pad rubbing.

For the next set of experiments, aluminum coated titania abrasives ~200 nm size at 2.5% solids loading were utilized.

TABLE 7

Removal rate vs different oxidizers at 3 psi DF and at different pH values

| Oxidizer | Oxidizer concentration (weight %) | PH | Removal Rate (Å/min) |
|---|---|---|---|
| Hydrogen Peroxide | 0.001 | 11.5 | 210 |
| Hydrogen Peroxide | 0.1 | 11.5 | 230 |
| Hydrogen Peroxide | 1 | 11.5 | 345 |
| Hydrogen Peroxide | 2 | 11.5 | 400 |
| Hydrogen Peroxide | 5 | 11.5 | 410 |
| Hydrogen Peroxide | 2 | 7 | 320 |
| Hydrogen Peroxide | 2 | 9 | 270 |
| Hydrogen Peroxide | 2 | 10 | 315 |
| Hydrogen Peroxide | 2 | 12.5 | 450 |
| Periodic Acid | 0.001 | 6 | 715 |
| Periodic Acid | 0.1 | 6 | 925 |
| Periodic Acid | 1.5 | 6 | 1216 |
| Periodic Acid | 5 | 6 | 1412 |
| Periodic Acid | 1.5 | 11 | 778 |
| Periodic Acid | 1.5 | 12.5 | 830 |
| Potassium Periodate | 0.001 | 9 | 685 |
| Potassium Periodate | 0.42 | 9 | 1115 |
| Potassium Periodate | 0.42 | 11 | 986 |
| Potassium Periodate | 3 | 12.5 | 1286 |

The above data reflects runs above pH 6; as below pH 6 there is a possibility of formation of toxic $RuO_4$ (ruthenium tetroxide). Also, as pH goes higher, the pad staining reduces; it reduces drastically above pH 9 and almost no staining is observed at pH 12.5. This can be attributed to formation of soluble $RuO_4^-/RuO_2^-$ ions at higher pH instead of $RuO_2$ and $RuO_4$.

ASPECTS

In a first aspect, the invention provides a composition comprising:
a liquid carrier;
titania abrasive particles, wherein the particles are at least partially coated with alumina or amorphous silica to provide coated titania abrasive particles;
wherein the coated titania abrasive particles have an average diameter of about 50 nm to about 250 nm; and
a corrosion inhibitor.

In a second aspect, the invention provides the composition of the first aspect, wherein the coated titania abrasive particles are coated with alumina.

In a third aspect, the invention provides the composition of the first or second aspect, wherein the coated titania abrasive particles are coated with amorphous silica.

In a fourth aspect, the invention provides the composition of any of the first, second, or third aspects, wherein the corrosion inhibitor is a cationic surfactant.

In a fifth aspect, the invention provides the composition of any one of the first through fourth aspects, wherein the corrosion inhibitor is chosen from benzalkonium chloride and benzalkonium bromide.

In a sixth aspect, the invention provides the composition of any one of the first through fifth aspects, wherein the pH is about 2 to about 5.

In a seventh aspect, the invention provides the composition of any one of the first through sixth aspects, further comprising at least one oxidizing agent.

In an eighth aspect, the invention provides the composition of the seventh aspect, wherein the oxidizing agent is chosen from hydrogen peroxide and periodic acid.

In a ninth aspect, the invention provides a method for chemical mechanical polishing a substrate which includes a surface comprising at least one transition metal, the method comprising:
  contacting the substrate with a composition comprising:
    a liquid carrier;
    titania abrasive particles, wherein the particles are at least partially coated with alumina or amorphous silica to provide coated titania abrasive particles;
    wherein the coated titania abrasive particles have an average diameter of about 50 nm to about 250 nm; and
    a corrosion inhibitor;
  moving the composition relative to the substrate; and
  abrading the substrate to remove a portion of the surface comprising at the least one transition metal.

In a tenth aspect, the invention provides the method of the ninth aspect, wherein the surface comprises molybdenum.

In an eleventh aspect, the invention provides the method of the ninth aspect, wherein the surface comprises ruthenium.

In a twelfth aspect, the invention provides the method of the ninth, tenth, or eleventh aspects, wherein the pH is about 2 to about 5.

In a thirteenth aspect, the invention provides the method of any one of the ninth through the twelfth aspects, wherein the coated titania abrasive particles are coated with alumina.

In a fourteenth aspect, the invention provides the method of any one of the ninth through the thirteenth aspects, wherein the coated titania abrasive particles are coated with amorphous silica.

In a fifteenth aspect, the invention provides the method of any one of the ninth through the fourteenth aspects, wherein the corrosion inhibitor is chosen from benzalkonium chloride and benzalkonium bromide.

In a sixteenth aspect, the invention provides a method for chemical mechanical polishing a substrate which includes a surface comprising at least one of molybdenum or ruthenium, the method comprising:
  contacting the substrate with a composition comprising:
    a liquid carrier;
    titania abrasive particles, wherein the particles are at least partially coated with alumina or amorphous silica to provide coated titania abrasive particles;
    wherein the coated titania abrasive particles have an average diameter of about 50 nm to about 250 nm; and
    a corrosion inhibitor.
  moving the composition relative to the substrate; and
  abrading the substrate to remove a portion of the surface comprising the at least one of molybdenum or ruthenium.

In a seventeenth aspect, the invention provides a kit, including in one or more containers, components chosen from components a., b., and c, as defined in any one of the first through the eighth aspects.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A composition comprising:
  a liquid carrier;
  titania abrasive particles, wherein the particles are at least partially coated with alumina or amorphous silica to provide coated titania abrasive particles;
  wherein the coated titania abrasive particles have an average diameter of about 50 nm to about 250 nm; and
  a corrosion inhibitor, wherein the pH is about 2 to about 5.

2. The composition of claim 1, wherein the coated titania abrasive particles are coated with alumina.

3. The composition of claim 1, wherein the coated titania abrasive particles are coated with amorphous silica.

4. The composition of claim 1, wherein the corrosion inhibitor is a cationic surfactant.

5. The composition of claim 4, wherein the corrosion inhibitor is chosen from benzalkonium chloride and benzalkonium bromide.

6. The composition of claim 1, further comprising at least one oxidizing agent.

7. The composition of claim 6, wherein the oxidizing agent is chosen from hydrogen peroxide and periodic acid.

* * * * *